(12) United States Patent
Huang (10) Patent No.: US 8,422,095 B2
(45) Date of Patent: Apr. 16, 2013

(54) IMAGE SCANNER (75) Inventor: Yung-Lun Huang, Taipei (TW)

(73) Assignee: Hon Hai Precision Industry Co., Ltd., New Taipei (TW)

( * ) Notice: Subject to any disclaimer, the term of this patent is extended or adjusted under 35 U.S.C. 154(b) by 472 days.

(21) Appl. No.: 12/786,351

(22) Filed: May 24, 2010

(65) Prior Publication Data
US 2011/0176184 A1 Jul. 21, 2011

(30) Foreign Application Priority Data
Jan. 21, 2010 (TW) ................................ 99101696 A (51) Int. Cl.
*H04N 1/04* (2006.01)

(52) U.S. Cl.
USPC ............ 358/475; 358/509; 358/474; 382/275

(58) Field of Classification Search .................. 358/474, 358/488, 475, 509, 497, 486; 382/254, 274, 382/275
See application file for complete search history.

(56) References Cited

U.S. PATENT DOCUMENTS

| | | | | |
|---|---|---|---|---|
| 5,251,072 A * | 10/1993 | Fukuoka et al. | | 359/896 |
| 5,467,172 A * | 11/1995 | Liao | | 399/380 |
| 5,608,537 A * | 3/1997 | Manabe et al. | | 358/401 |
| 6,163,385 A * | 12/2000 | Kajander | | 358/475 |
| 6,445,480 B1 * | 9/2002 | Huang et al. | | 359/196.1 |
| 6,661,538 B1 * | 12/2003 | Takeuchi | | 358/474 |
| 6,999,212 B2 * | 2/2006 | Mai et al. | | 358/504 |
| 7,202,983 B2 * | 4/2007 | Yokota et al. | | 358/496 |
| 7,209,268 B2 * | 4/2007 | Ikeda | | 358/475 |
| 7,733,538 B2 * | 6/2010 | Kanesaka et al. | | 358/474 |
| 7,852,525 B2 * | 12/2010 | Nogami et al. | | 358/497 |
| 8,027,068 B2 * | 9/2011 | Shimizu et al. | | 358/496 |
| 8,218,204 B2 * | 7/2012 | Hozono | | 358/474 |
| 8,223,405 B2 * | 7/2012 | Osakabe et al. | | 358/471 |
| 2009/0034024 A1 * | 2/2009 | Kim et al. | | 358/475 |
| 2010/0046045 A1 * | 2/2010 | Nagao et al. | | 358/474 |

* cited by examiner

*Primary Examiner* — Negussie Worku
(74) *Attorney, Agent, or Firm* — Altis Law Group, Inc.

(57) ABSTRACT

An image scanner includes a light-pervious supporting plate, an enclosure, an image sensor, several light sources, and two or four light guide plates. The supporting plate supports an original to be scanned. The enclosure and the supporting plate cooperatively define a receiving space. The image sensor is received in the receiving space, and has a receiving surface. The two, four, or six light sources emit light. The light guide plates each include a light incident surface and an output surface. The light incident surface is configured for receiving light from the respective light sources. The output surface is configured for emission of surface light to scan the original on the supporting plate. In this manner, the surface light is reflected by the original to the receiving surface of the image sensor, thus an image of the original is captured.

20 Claims, 13 Drawing Sheets

IMAGE SCANNER

BACKGROUND

1. Technical Field

The disclosure generally relates to image scanners, and particularly, to an image scanner capable of providing more uniform surface light.

2. Description of Related Art

A frequently used scanner includes a linear light source and a linear sensor. The linear light source emits light and scans a portion of an original. The light is reflected by the original to the linear sensor, and an image of the original is captured. Generally, the linear light source is moved from one end of the original to the other. It takes time to move the linear light source, and the light may not uniformly scan the original during the movement, which can result in an inferior quality image.

Therefore, what is needed is an image scanner that can overcome the described limitations.

BRIEF DESCRIPTION OF THE DRAWINGS

Many aspects of the disclosure can be better understood with reference to the following drawings. The components in the drawings are not necessarily drawn to scale, the emphasis instead being placed upon clearly illustrating the principles of the present image scanner. Moreover, in the drawings, all the views are schematic, and like reference numerals designate corresponding parts throughout the several views.

DETAILED DESCRIPTION OF EMBODIMENTS

Embodiments of the image scanner will now be described in detail and with reference to the drawings.

Figure 1:
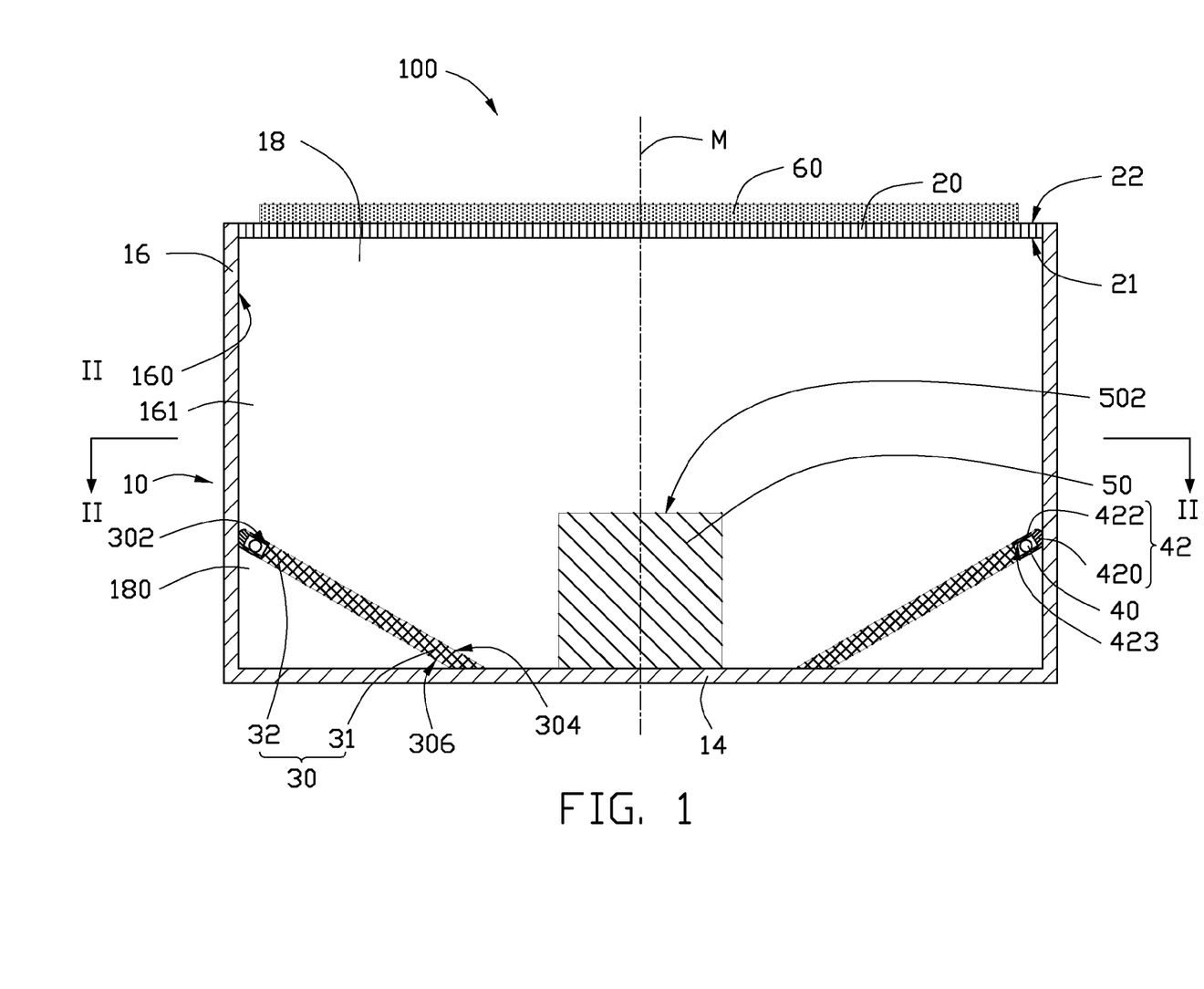
FIG. 1 a sectional view of an image scanner, in accordance with a first embodiment.
Figure 2:
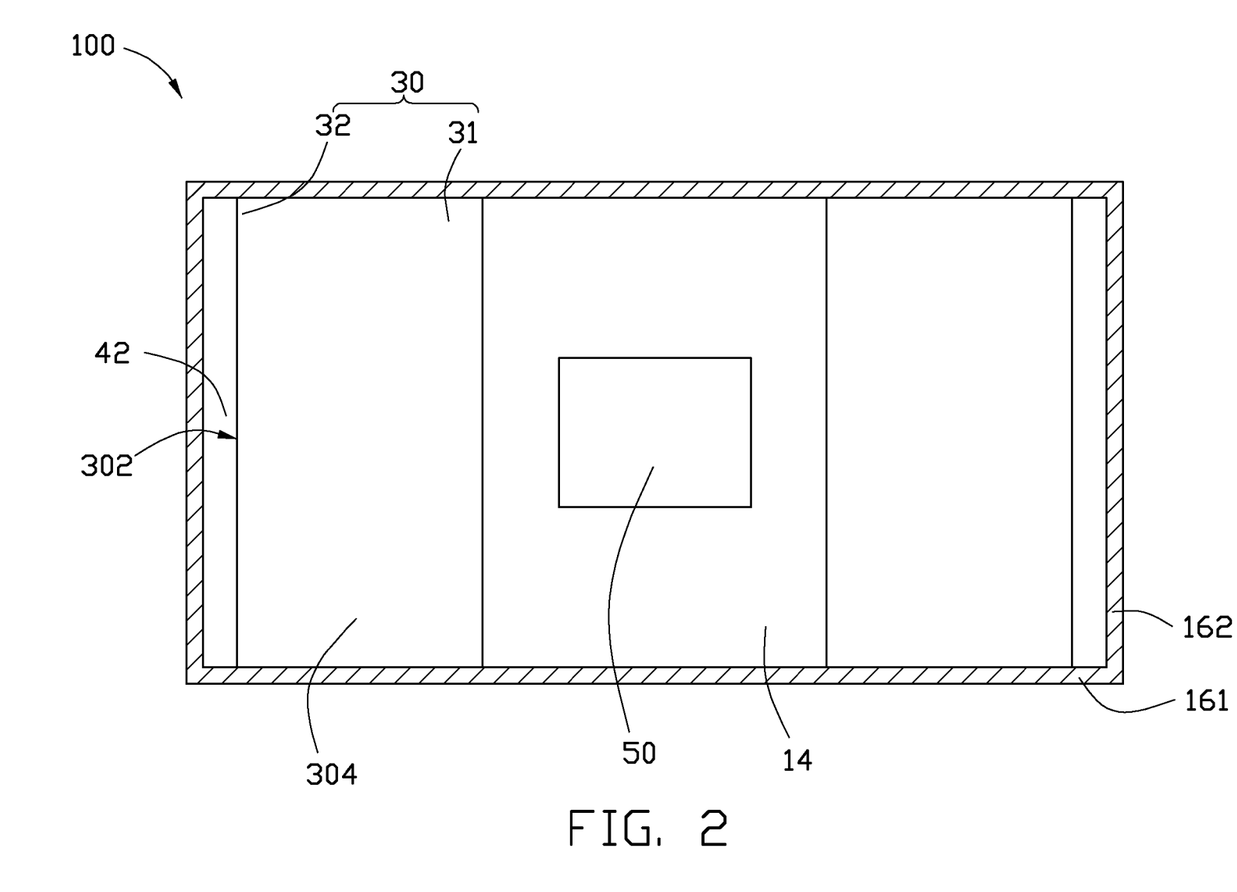
FIG. 2 is a cross section of the image scanner of FIG. 1, along line II-II.

Referring to FIGS. 1 and 2, an image scanner 100, in accordance with a first embodiment is shown. The image scanner 100 includes an enclosure 10, a light-pervious supporting plate 20, two light guide plates 30, two light sources 40, and an image sensor 50.

The enclosure 10 includes a baseboard 14 and a holder 16. The holder 16 extends upwardly from a peripheral portion of the baseboard 14. The enclosure 10 defines a central axis M. A cross-section of the holder 16 is substantially rectangular, and the holder 16 includes four exterior peripheral sides, for example, two first peripheral sides 161 and two second peripheral sides 162 in parallel, respectively. Each of the second peripheral sides 162 is located between and adjoins the two first peripheral sides 161. In this embodiment, the two first peripheral sides 161 are symmetrically opposite to each other across the central axis M. The two second peripheral sides 162 are symmetrically opposite to each other across the central axis M. Each second peripheral side 162 and the baseboard 14 cooperatively define a corner 180 at an adjoining portion thereof.

The supporting plate 20 is adjacent to a distal end of the holder 16 away from the baseboard 14. The supporting plate 20 and the enclosure 10 cooperatively define a receiving space 18. In this embodiment, the supporting plate 20 is received in the receiving space 18. A peripheral side of the supporting plate 20 is attached to the first peripheral sides 161 and the second peripheral sides 162, respectively. The supporting plate 20 includes a bottom surface 21 facing the baseboard 14, and a supporting surface 22 facing away from the baseboard 14. Generally, the supporting plate 20 can be made of light-pervious material such as glass or plastic. In this embodiment, the supporting plate 20 is made of plastic with an anti-glare layer (not shown) formed on the bottom surface 21. An original 60 to be scanned is positioned on the supporting surface 22.

Referring again to FIG. 2, the two light guide plates 30 are received in the receiving space 18 and located at the respective corners 180, and configured for changing the light from the light source 40 into surface light. In this embodiment, the two light guide plates 30 are each generally cuboid. The light guide plate 30 is substantially perpendicular to the first peripheral sides 161 and angled relative to both the baseboard 14 and the second peripheral sides 162 (see FIG. 1). In particular, the two light guide plates 30 are symmetrical across the central axis M. As shown in FIG. 2, each of the two light guide plates 30 includes a first end 31 and a second end 32 at two opposite sides thereof. The first end 31 is attached to the baseboard 14 and spaced from the image sensor 50. The second end 32 is attached adjacent to the second peripheral side 162. Generally, the light guide plate 30 includes a light incident surface 302, an output surface 304, and a bottom surface 306. The light incident surface 302 is located at the second end 32. The output surface 304 adjoins the light incident surface 302 and substantially faces the supporting plate 20. In particular, the output surface 304 is angled with respect to the supporting surface 22 of the supporting plate 20. The bottom surface 306 is located substantially opposite to the output surface 304 and adjoins the light incident surface 302.

The two light sources 40 are configured for illuminating the two respective light guide plates 30. In this embodiment, each of the light sources 40 is a linear light source, and are elongated between the two first peripheral sides 161 (see FIG. 2). The image scanner 100 may further include two housings 42 for receiving the respective light sources 40 therein. In particular, each of the two housings 42 includes a substantially curved portion 420 and a column 422 extending from a periphery of the curved portion 420. The curved portion 420 is attached to the second peripheral side 162. The two columns 422 are attached to the light incident surface 302 of the light guide plate 30. With this configuration, the second ends 32 of the two light guide plates 30 are attached to the respective second peripheral sides 162 via the two housings 42.

Each of the housings 42 has an inner surface 423 defining an inner space therein. The two light sources 40 are received in the respective inner spaces. The light source 40 faces the light incident surface 302 and emits light to the light guide plate 30 through the light incident surface 302. In this embodiment, the inner surface 423 of the housing 40 has a reflective layer (not shown) formed thereon, and the bottom surface 306 of each light guide plate 30 may have a plurality of scattering-dots (not shown) evenly distributed thereon. With this configuration, when the light source 40 emits light, the reflective layer converges light to enter the light incident surface 302, and the scattering-dots 124 reflect and diffract the light. The light thus is changed into a more uniform surface light, which is outputted from the output surface 304 of the light guide plate 30. In this manner, light utilization efficiency of the light source 40 is increased, and uniformity of the surface light is improved. It is noted that the uniform surface light from the two light guide plates 30 is directed to scan an original 60 in its original size. To further increase light utilization efficiency of the light source 40, an interior surface 160 of the holder 16 defined in the receiving space 18 may also have a reflective layer (not shown) formed thereon. In this manner, a portion of the uniform surface light not reaching the original 60 is redirected thereto.

The image sensor 50 is arranged on a central portion of the baseboard 14, and includes a receiving surface 502 facing the bottom surface 21 of the supporting plate 20. In particular, the central axis M of the enclosure 10 passes through the image sensor 50. The receiving surface 502 senses the uniform surface light reflected by the original 60. In this embodiment, the image sensor 50 can be an area sensor. In operation, the image sensor 50 captures an image of the original 60 and generates a corresponding electric signal when it senses the uniform surface light reflected by the original 60. The electric signal is transmitted to an external terminal (not shown). In one typical example, the external terminal can be a computer. The computer processes the electric signal to eventually display the image of the original 60.

In this embodiment, to fully receive the light reflected by the original 60, the receiving surface 502 of the image sensor 50 has a surface area with a comparison ratio of 1:30 as compared to the surface area of the supporting surface 32. In addition, a shortest distance between the output surface 304 of each light guide plate 30 and the supporting surface 32 exceeds or equals a distance between the receiving surface 502 and the supporting surface 32. With this configuration, the output surface 304 is located below the receiving surface 502, and light therefrom is prevented from reaching the receiving surface 502. Accordingly, a clear image of the original 60 can be obtained.

Figure 3:
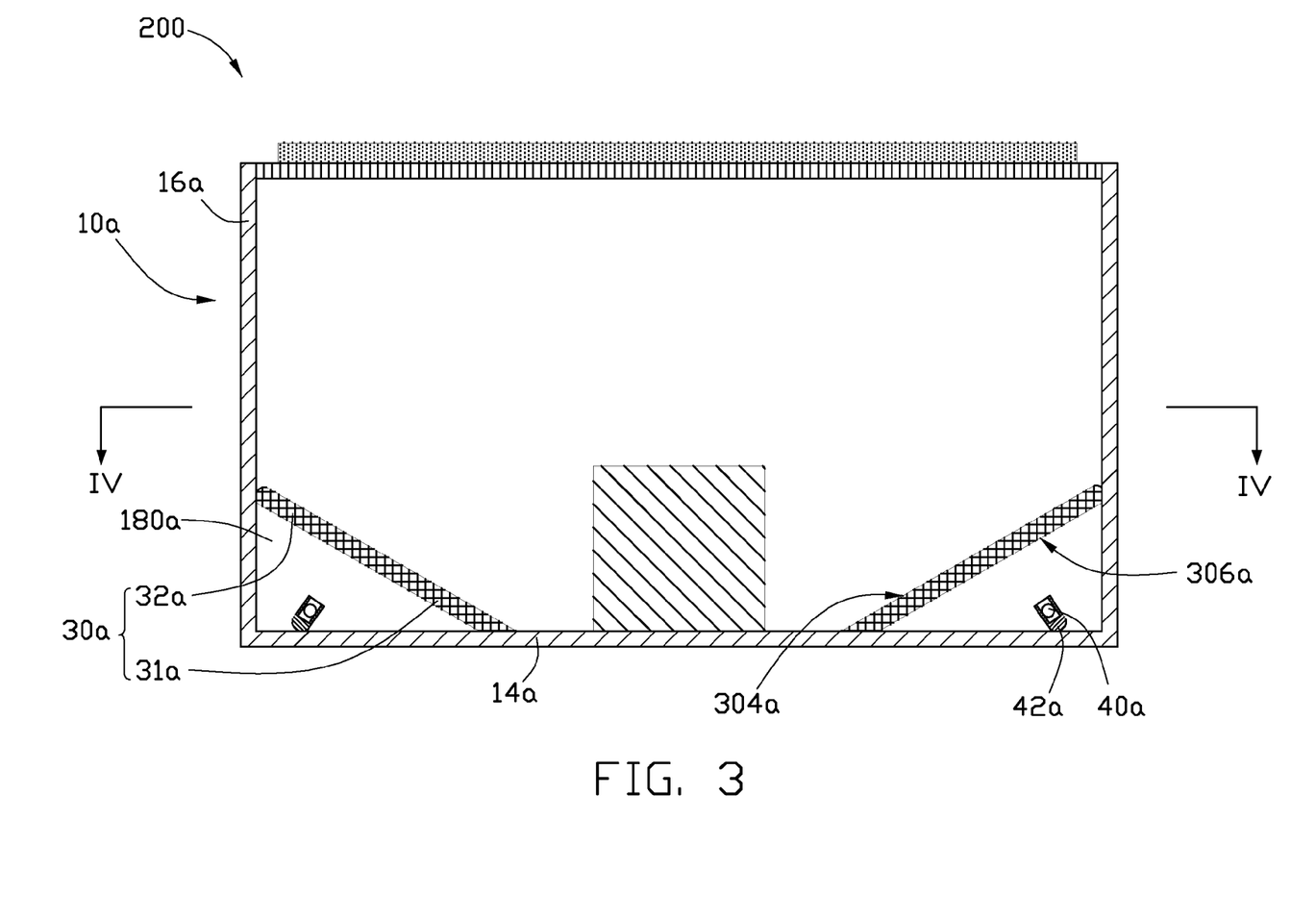
FIG. 3 is a sectional view of an image scanner, in accordance with a second embodiment.
Figure 4:
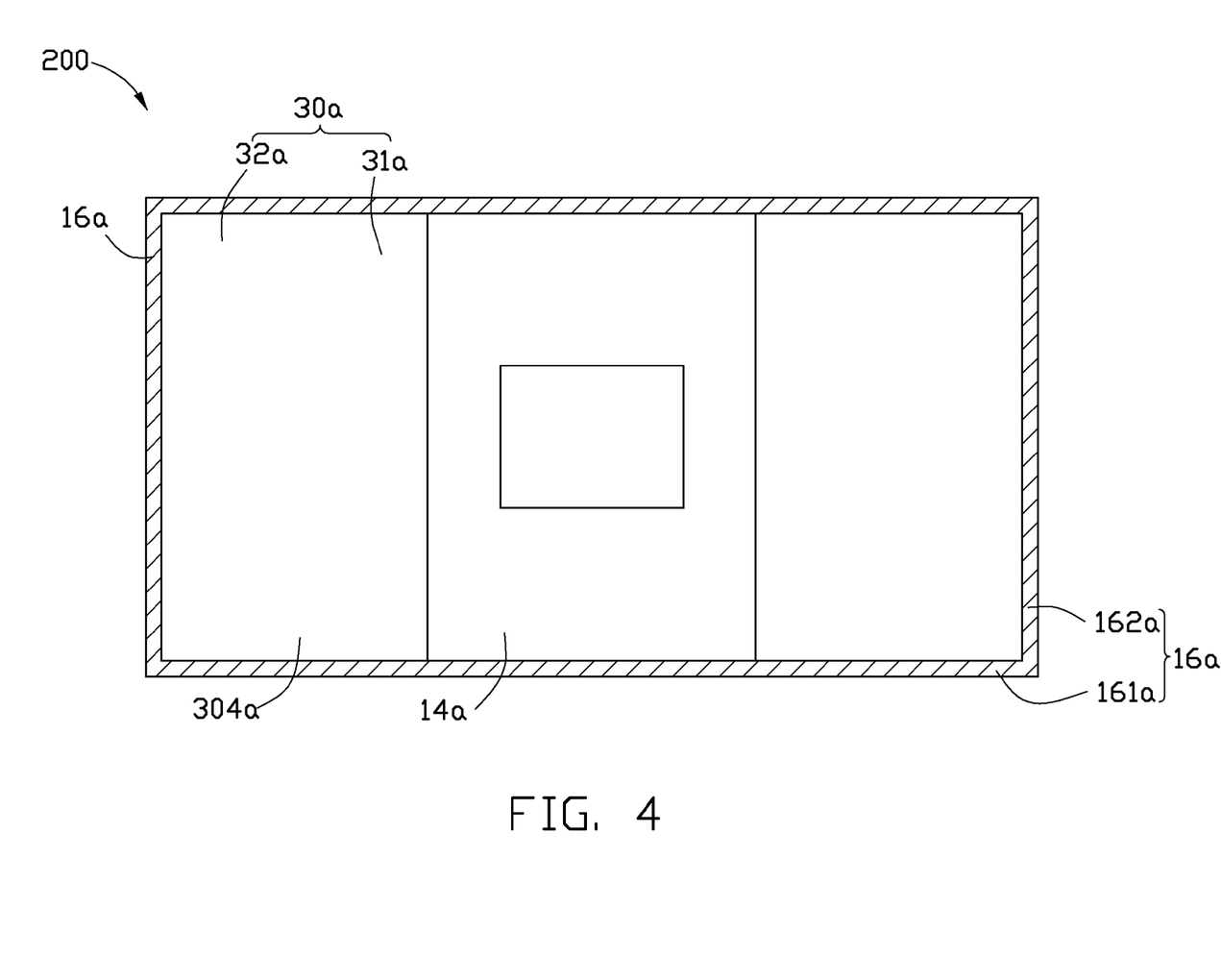
FIG. 4 is a cross section of the image scanner of FIG. 3, along line IV-IV.

Referring to FIGS. 3-4, an image scanner 200 in accordance with a second embodiment is shown, differing from the image scanner 100 of the first embodiment only in that the second end 32a of the light guide plate 30a is not attached to the second peripheral side 162a via the housings 42a. Rather, the second end 32a of the light guide plate 30a is directly attached to the second peripheral side 162a. The baseboard 14a and the two second peripheral sides 162a cooperatively define two corners 180a. The two housings 42a with the two respective light sources 40a received therein are located at the two respective corners 180a. The light sources 40a each face a bottom surface 306a of the light guide plate 30a. In this embodiment, the bottom surface 306a opposite to an output surface 304a serves as a light incident surface of the light guide plate 30a. Light from the light source 40a enters the light guide plates 30a through the bottom surface 306a, and is further outputted from the output surface 304a.

Figure 5:
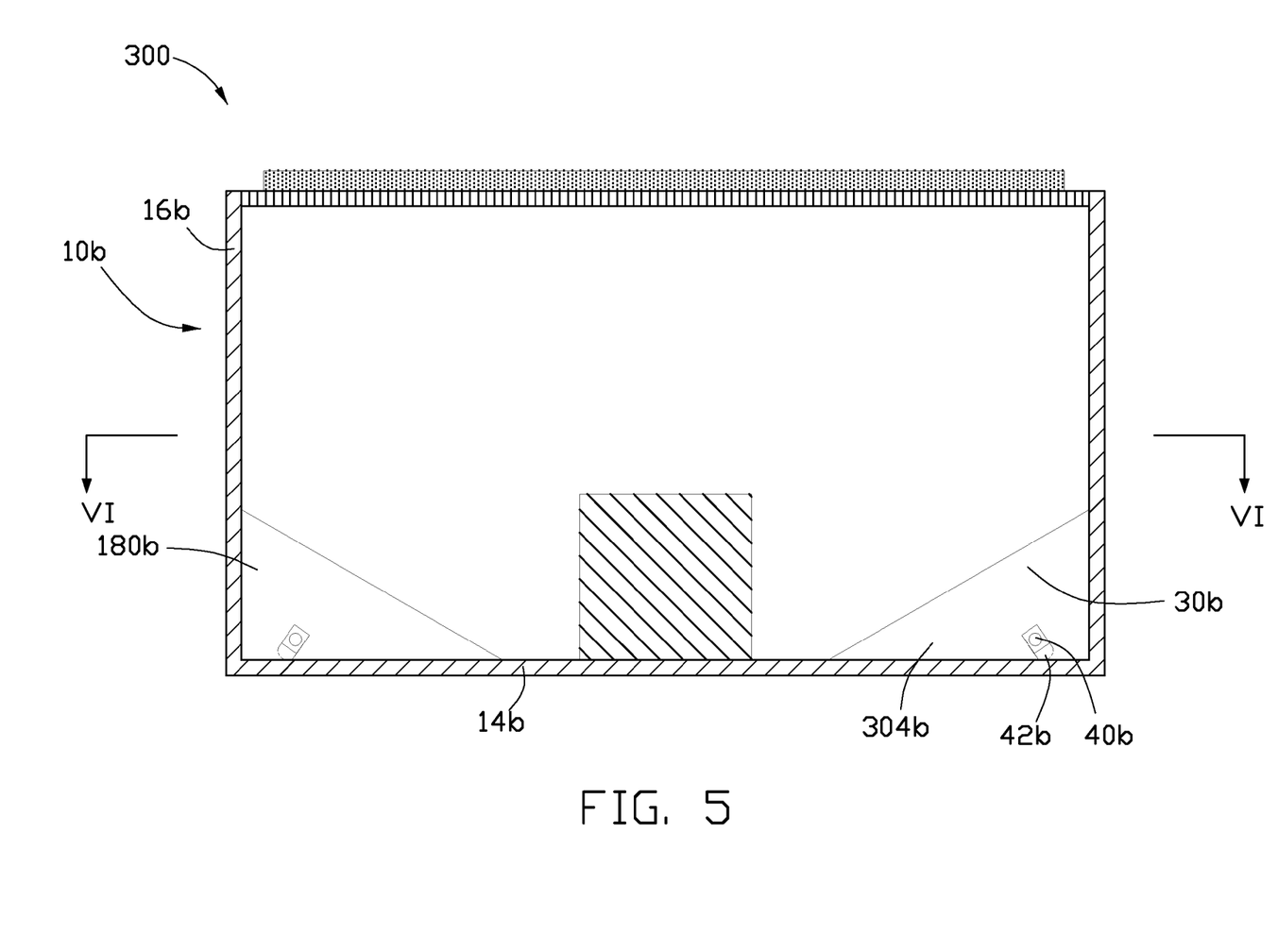
FIG. 5 is a sectional view of an image scanner, in accordance with a third embodiment.
Figure 6:
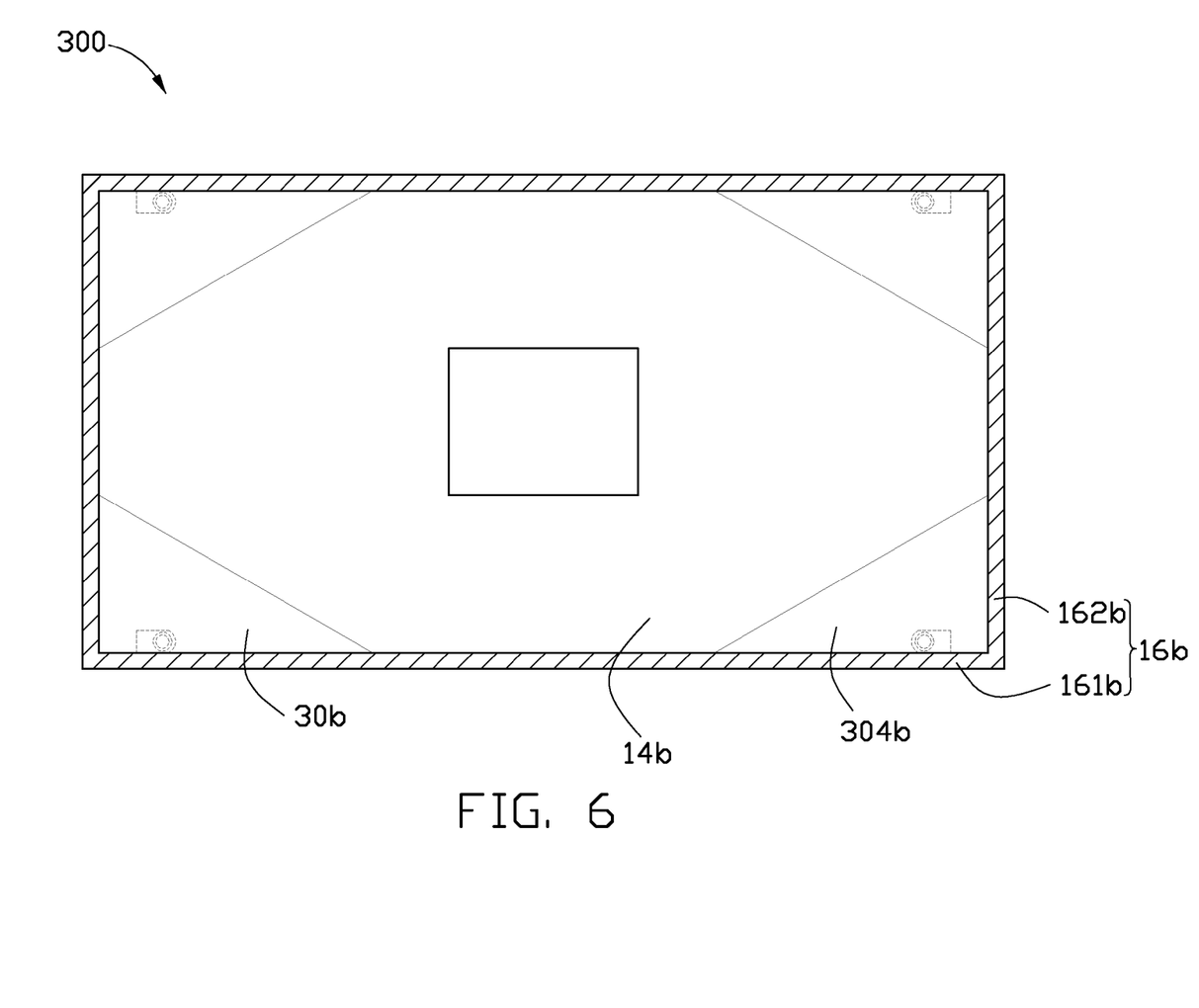
FIG. 6 is a cross section of the image scanner of FIG. 5, along line VI-VI.

Referring to FIGS. 5-6, an image scanner 300 in accordance with a third embodiment is shown, differing from the image scanner 200 of the second embodiment only in that the image scanner 300 includes four generally triangular light guide plates 30b, each of the light guide plates 30b are angled relative to the baseboard 14b, and the respective neighboring first and second peripheral sides 161b, 162b. The four triangular light guide plates 30b and the enclosure 10b cooperatively define four corners 180b receiving the respective four light sources 40b. The light source 40b faces a bottom surface (not shown) of the corresponding light guide plate 30b, which is opposite to an output surface 304b. In this embodiment, the bottom surface also serves as a light incident surface for receiving light from the light source 40b. In particular, each of the four light sources 40b can be a point light source, for example, a light emitting diode (LED). Accordingly, the image scanner 300 includes four housings 42b for fittingly receiving the four respective light sources 40b.

Figure 7:
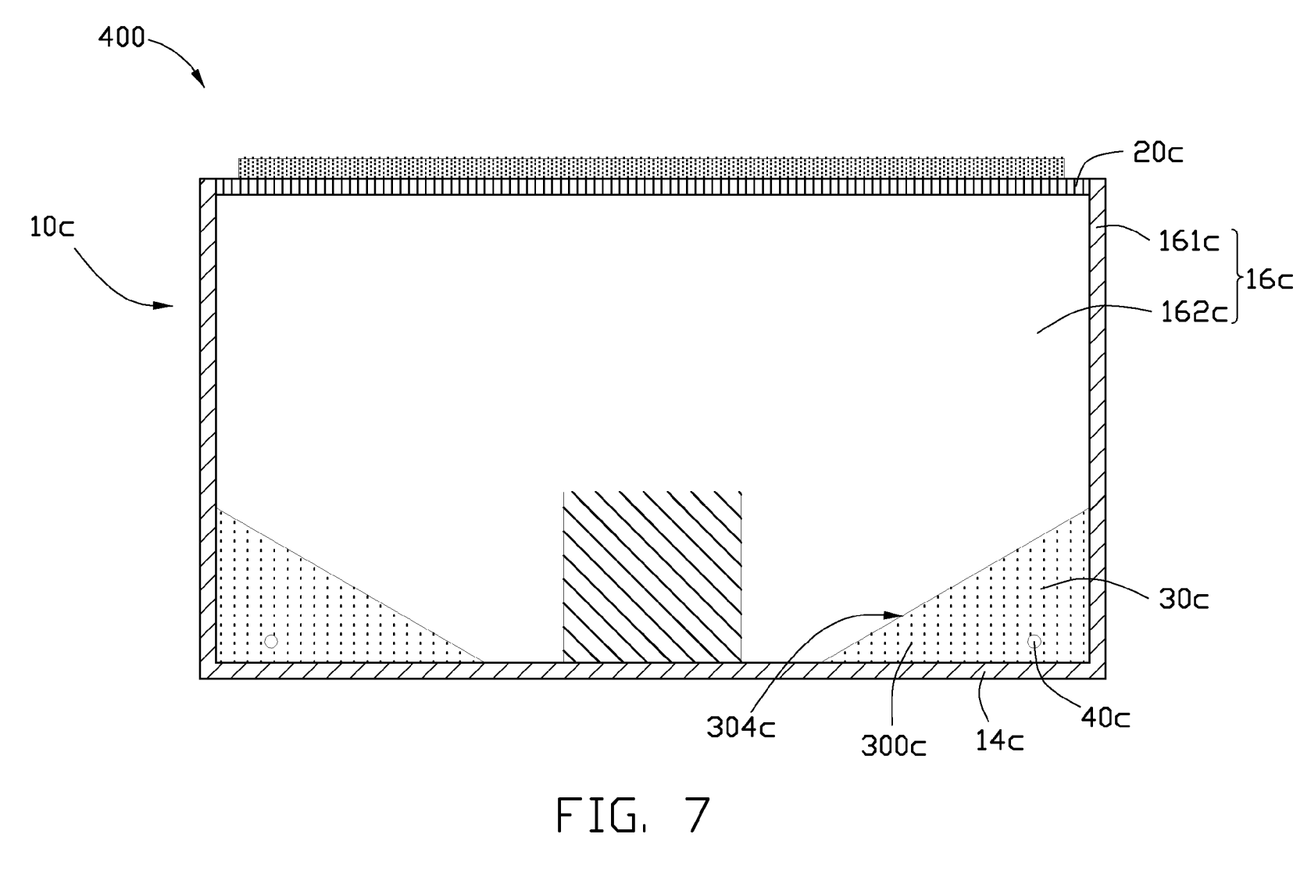
FIG. 7 is a sectional view of an image scanner, in accordance with a fourth embodiment.

Referring to FIG. 7, an image scanner 400 in accordance with a fourth embodiment is shown, differing from image scanner 300 of the second embodiment only in that an encapsulation layer 30c is prism-shaped and sandwiched between the two first peripheral sides 161c. The encapsulation layers 30c are configured for encapsulating the respective light sources 40c. In this embodiment, a base material of the encapsulation layers 30c can be resin, silicone, epoxy, polyethylene terephthalate (PET), polymethyl methacrylate (PMMA), or polycarbonate (PC). Alternatively, the encapsulation layer 30c can be other suitable material such as glass. In operation, light from the light sources 40c passes through the encapsulation layer 30c and emits surface light through the output surface 304c. To improve uniformity of the surface light, the encapsulation layer 30c may have a number of diffusing particles 300c uniformly distributed in the base material thereof. The diffusing particle 300c for example, can be $Al_2O_3$. In particular, a number of scattering-dots (not shown) can be further evenly distributed on the output surface 304c. With this configuration, uniformity of the surface light can be further improved.

Figure 8:
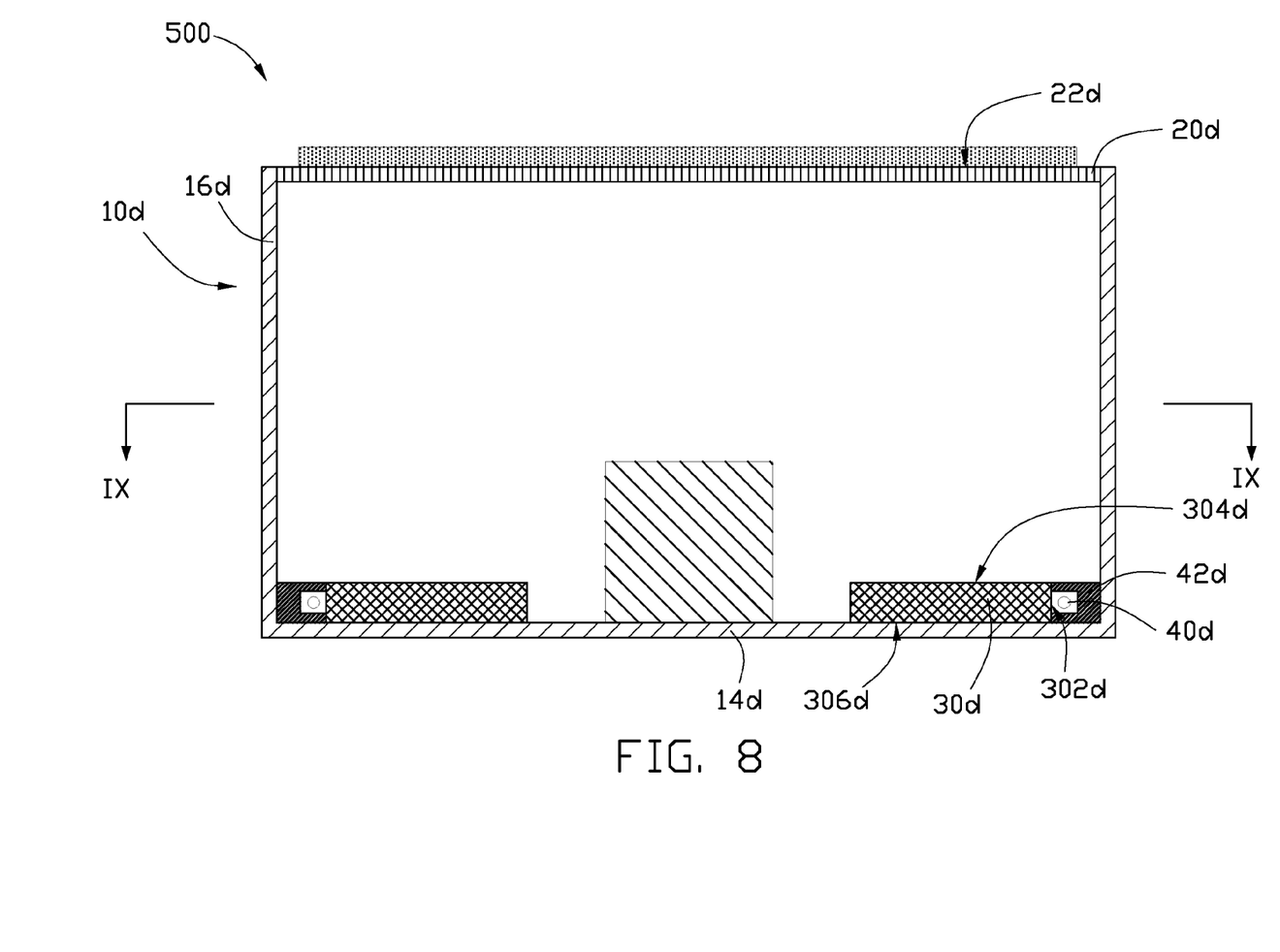
FIG. 8 is a sectional view of an image scanner, in accordance with a fifth embodiment.
Figure 9:
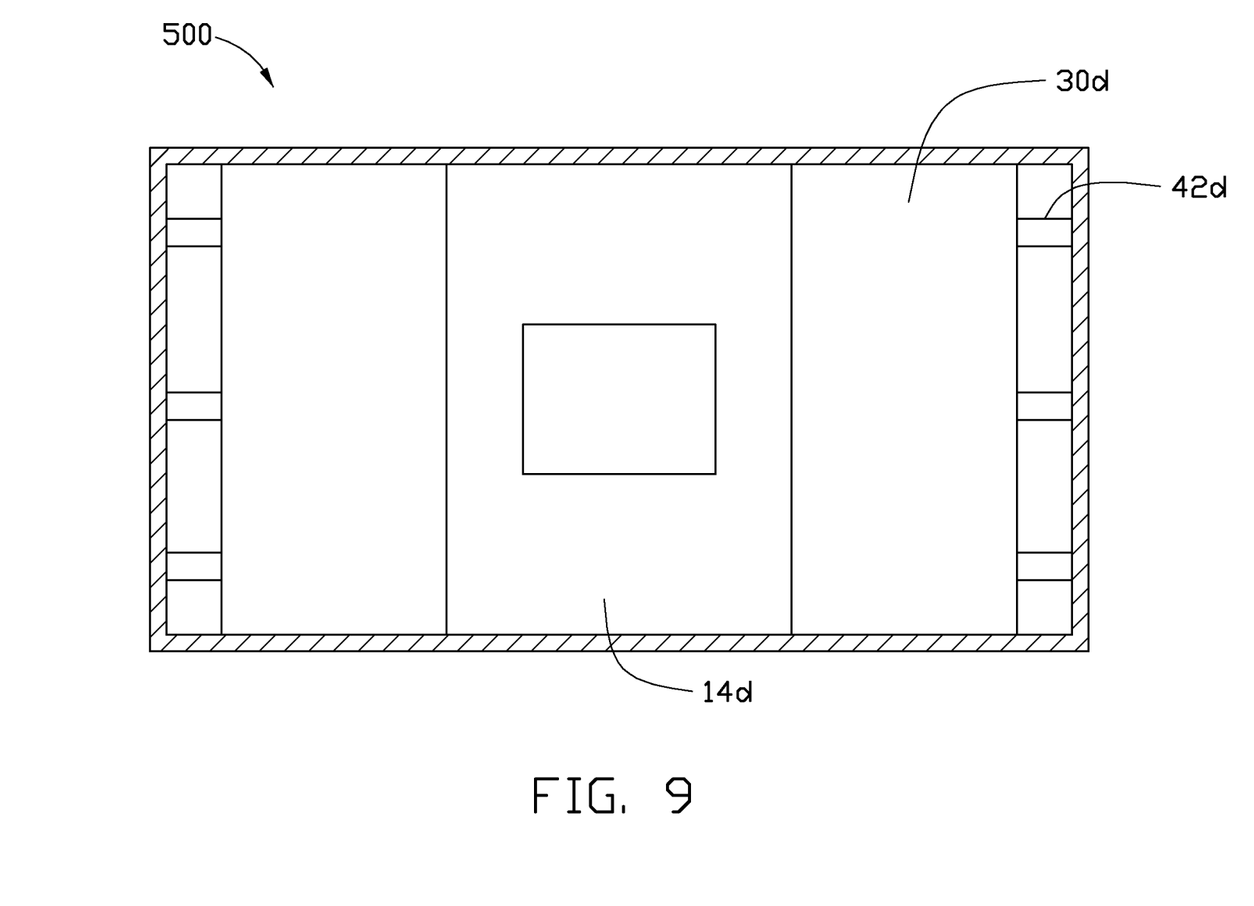
FIG. 9 is a cross section of the image scanner of FIG. 8, along line IX-IX.

Referring to FIGS. 8-9, an image scanner 500 in accordance with a fifth embodiment is shown, differing from the image scanner 100 of the first embodiment only in that the two light guide plates 30d are each not angled relative to the baseboard 14d, but being, rather, substantially parallel to the baseboard 14d. In particular, an output surface 304d of each light guide plate 30d is substantially parallel to a supporting surface 22d of the supporting plate 20d. In this embodiment, the two light guide plates 30d are arranged on the baseboard 14d. A bottom surface 306d of the light guide plates 30d is attached to the baseboard 14b. In addition, rather than two light sources 40d, the image scanner 500 has six light sources 40d illuminating the two light guide plates 30d. Each of the six light sources 40d is a point light source. Each light guide plate 30d has three light sources 40d attached thereto. The three light sources 40d face a light incident surface 302d of the corresponding light guide plate 30d. Accordingly, the image scanner 500 includes six housings 42b fittingly receiving the six respective light sources 40d.

Figure 10:
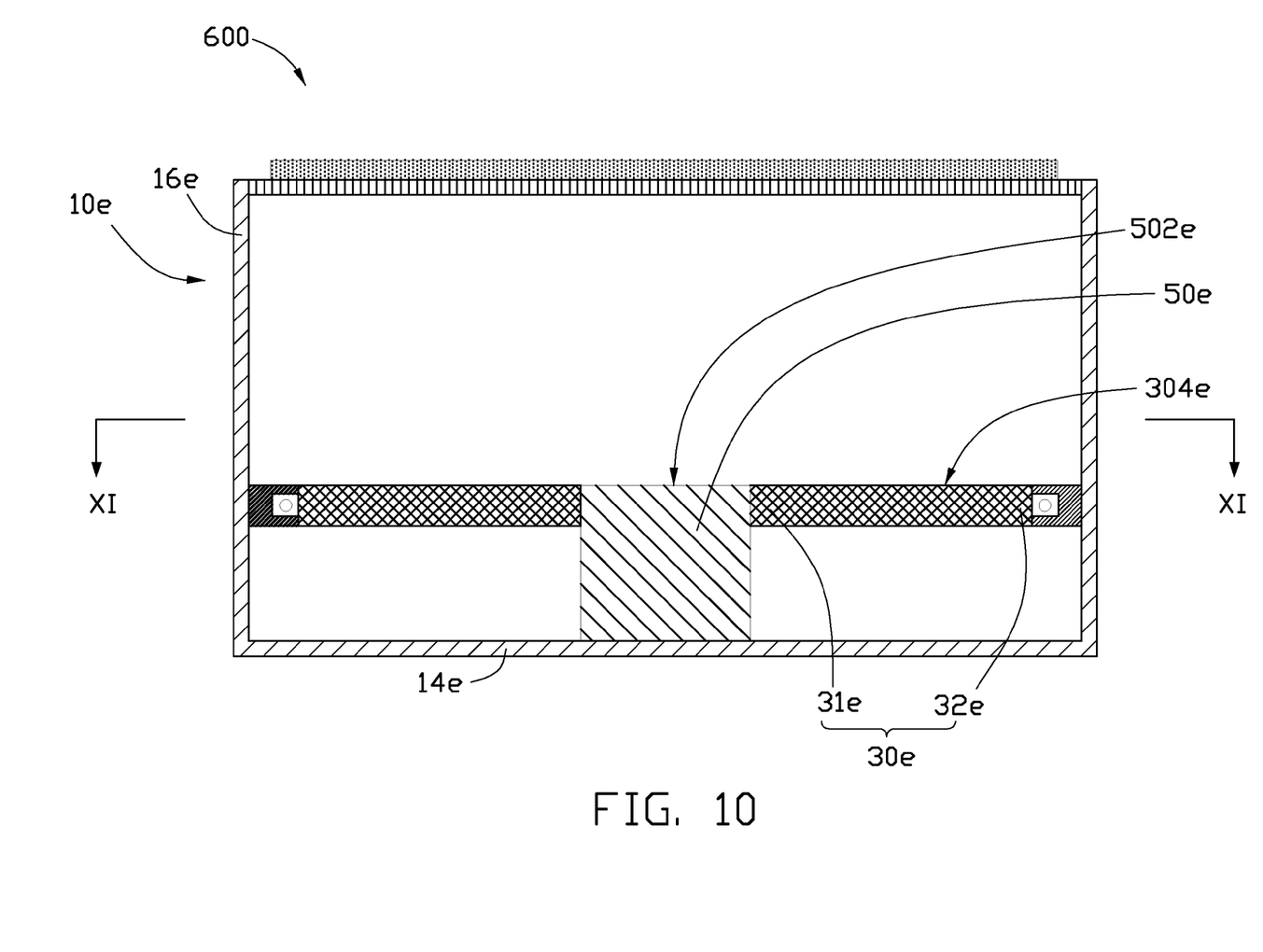
FIG. 10 is a sectional view of an image scanner, in accordance with a sixth embodiment.
Figure 11:
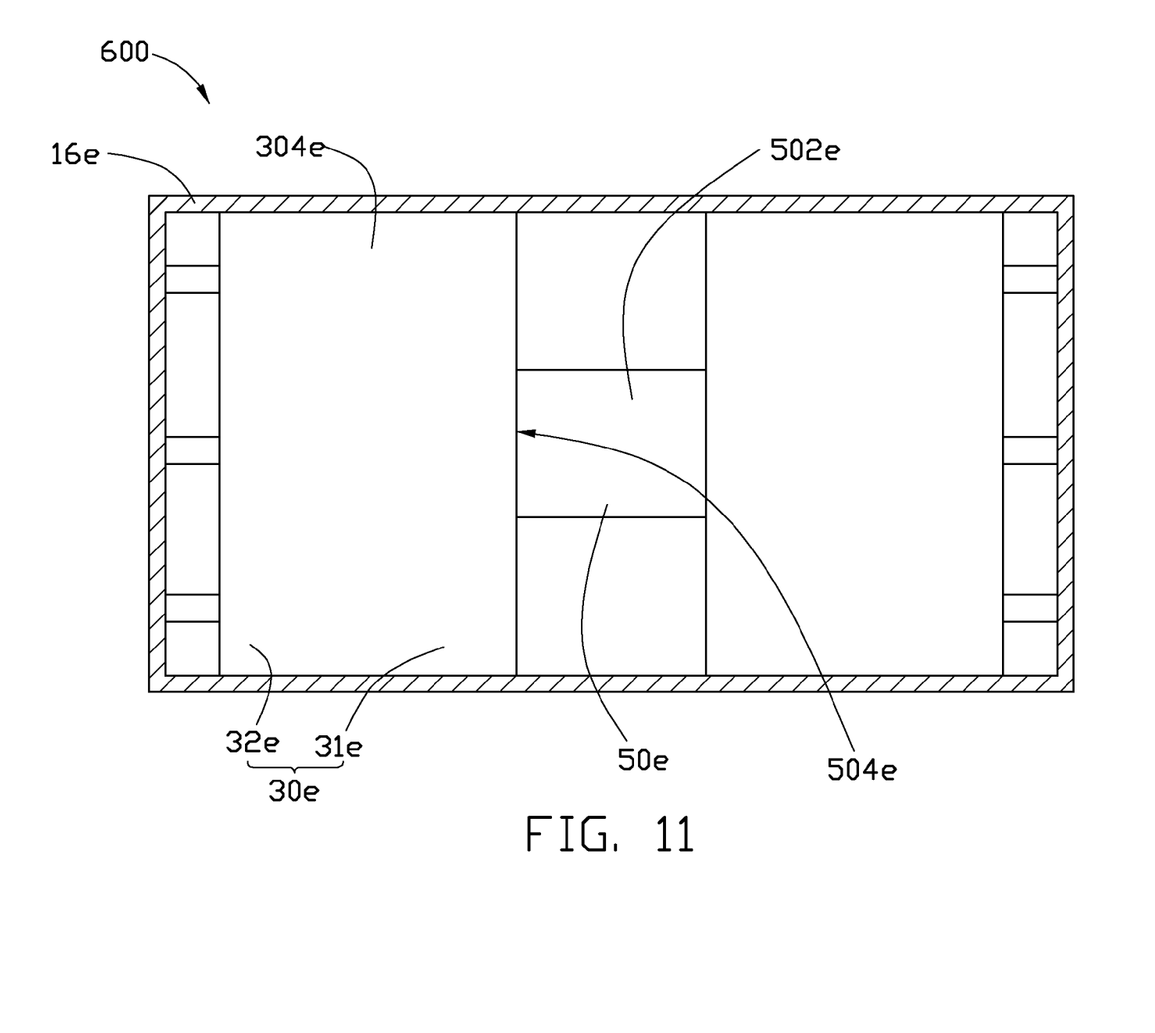
FIG. 11 is a cross section of the image scanner of FIG. 10, along line XI-XI.

Referring to FIGS. 10-11, an image scanner 600 in accordance with a sixth embodiment is shown, differing from the image scanner 500 of the fifth embodiment only in that the light guide plates 30e are not attached to the baseboard 14e. Rather, the light guide plates 30e are spaced from the baseboard 14e. The first end 31e of the light guide plates 30e is attached to a lateral side 504e of the image sensor 50e. The second end 32e of the light guide plates 30e is attached to the holder 16e. In this embodiment, the output surface 304e is coplanar with the receiving surface 502e to provide surface light with relatively high light intensity.

Figure 12:
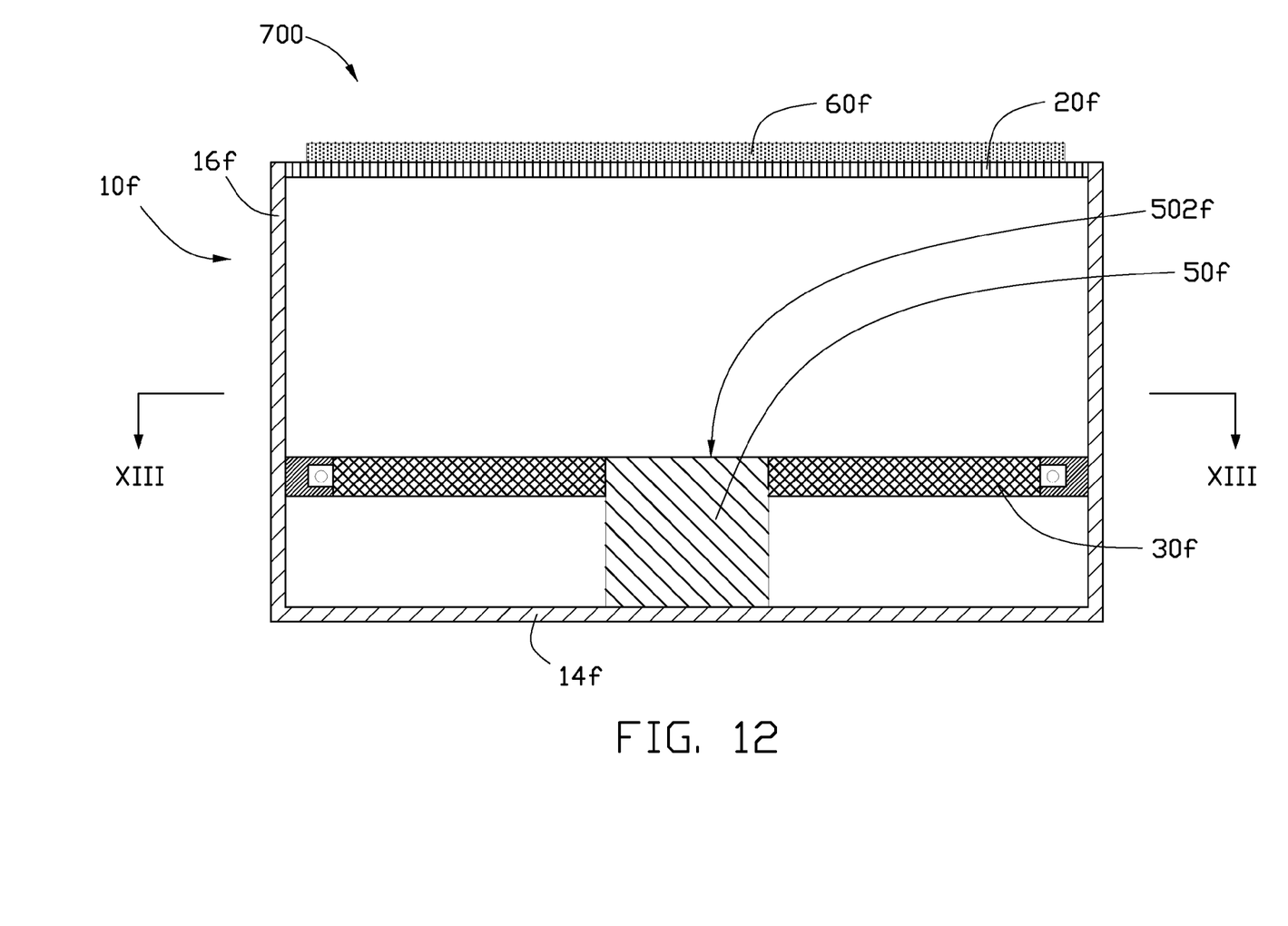
FIG. 12 is a sectional view of an image scanner, in accordance with a seventh embodiment.
Figure 13:
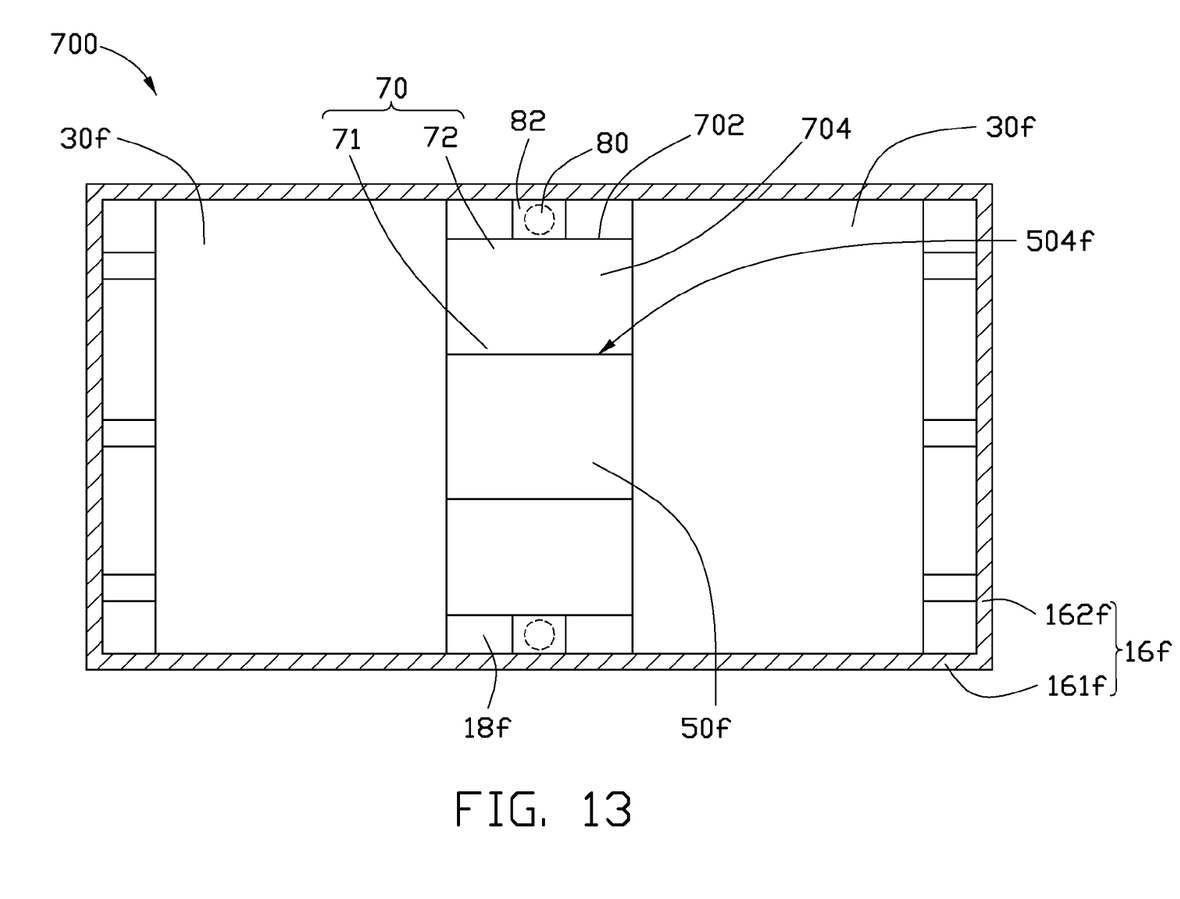
FIG. 13 is a cross section of the image scanner of FIG. 12, along line XIII-XIII.

Referring to FIGS. 12-13, an image scanner 700 in accordance with a seventh embodiment is shown, differing from the image scanner 600 of the sixth embodiment only in the further inclusion of another two light guide plates 70, another two light sources 80, another two housings 82, and an image sensor 50f. The two light sources 80 are received in the two respective housings 82 to illuminate the two respective light guide plates 70. The image sensor 50f has a receiving surface 502f. In this embodiment, the two light guide plates 70 associate with the two light guide plates 30f to surround the image sensor 50f. The two light guide plates 70 are smaller than the light guide plates 30f, and are positioned in a portion of the receiving space 18f, which is not occupied by the two light guide plates 30f and the image sensor 50f. The light guide plate 70 has a structure similar to the light guide plates 30f, and includes a light incident surface 702, an output surface 704, and a bottom surface (not visible). In particular, the light guide plate 70 includes a first end 71 attached to a lateral side 504f of the image sensor 50f, and a opposite second end 72 adjacent to the first peripheral sides 161f. The second end 72 is attached to the first peripheral sides 161f via the housing 82, which is receiving the corresponding light source 80. In this embodiment, the two light guide plates 70 are sandwiched between the two light guide plates 30f, respectively. The output surface 704 of each light guide plate 70 is coplanar with the receiving surface 502f of the image sensor 50f. The other two light guide plates 70 associating with the two light guide plates 30f provide even uniform surface light to scan an original 60f positioned on the supporting plate 20f.

It is understood that the above-described embodiments are intended to illustrate rather than limit the disclosure. Variations may be made to the embodiments without departing from the spirit of the disclosure. Accordingly, it is appropriate that the appended claims be construed broadly and in a manner consistent with the scope of the disclosure.

What is claimed is:

1. An image scanner, comprising:
   a supporting plate comprising a supporting surface for supporting an original to be scanned on the supporting surface;
   an enclosure, the enclosure and the supporting plate cooperatively defining a receiving space;
   an image sensor received in the receiving space, the image sensor comprising a receiving surface facing the supporting plate and is substantially parallel to the supporting surface;
   at least two light sources configured for emitting light; and
   at least two light guide plates received in the receiving space, wherein the at least two light guide plates each comprise a light incident surface for receiving light from the at least two respective light sources, and an output surface facing the supporting plate for emission of surface light to scan the original on the supporting plate, and the surface light is reflected by the original to the receiving surface of the image sensor such that an image of the original is captured by the image sensor.

2. The image scanner of claim 1, wherein the enclosure comprises a baseboard and a holder extending upwardly from a peripheral portion of the baseboard, the image sensor arranged on a central portion of the baseboard, and the supporting plate attached to a distal end of the holder away from the baseboard and substantially parallel to the baseboard.

3. The image scanner of claim 2, wherein a cross-section of the holder is substantially rectangular, and the holder comprises two first peripheral sides and two second peripheral sides in parallel, respectively, and the two second peripheral sides connect to the two first peripheral sides.

4. The image scanner of claim 3, wherein the output surface of each light guide plate is angled relative to the supporting surface.

5. The image scanner of claim 4, wherein the at least two light guide plates comprise two light guide plates arranged at two opposite sides of the image sensor, the light guide plates each comprise a first end attached to the baseboard and an opposite second end attached adjacent to the second peripheral side.

6. The image scanner of claim 5, wherein the two light guide plates are each substantially perpendicular to the two first peripheral sides.

7. The image scanner of claim 4, wherein the at least two light guide plates comprise four light guide plates, each is a generally triangular plate angled relative to the baseboard, and the respective neighboring first and second peripheral sides.

8. The image scanner of claim 4, wherein each light guide plate further comprises a bottom surface opposite to the output surface, and the light incident surface adjoins the output surface.

9. The image scanner of claim 4, wherein the light incident surface is opposite to the output surface.

10. The image scanner of claim 4, wherein a shortest distance between the supporting surface and the output surface exceeds or equals a distance between the supporting surface and the receiving surface.

11. The image scanner of claim 3, wherein the output surface of each light guide plate is substantially parallel to the supporting surface.

12. The image scanner of claim 11, wherein the at least two light guide plates comprise two light guide plates on two opposite sides of the image sensor.

13. The image scanner of claim 11, wherein the at least two light guide plates comprise four light guide plates surrounding the image sensor, the four light guide plates each comprising a first end attached to a lateral side of the image sensor and an opposite second end attached to the respective first and second peripheral sides.

14. The image scanner of claim 2, wherein the holder defines an interior surface in the receiving space, and the interior surface has a reflective layer formed thereon.

15. The image scanner of claim 2, wherein each light source comprises a linear light source or a point light source.

16. The image scanner of claim 2, wherein the image sensor comprises an area sensor.

17. An image scanner, comprising:
   a supporting plate comprising a supporting surface for supporting an original to be scanned;
   an enclosure, the enclosure and the supporting plate cooperatively defining a receiving space;
   an image sensor received in the receiving space, the image sensor comprising a receiving surface facing the supporting plate away from the supporting surface and substantially parallel to the supporting surface;
   at least two light sources configured for emitting light; and
   two light-pervious encapsulation layers received in the receiving space and encapsulating the at least two respective light sources, the two encapsulation layers each comprising a light-pervious base material and a plurality of diffusing particles uniformly distributed in the base material, and the two encapsulation layers each comprising an output surface facing the supporting plate for emission of surface light to scan the original on the supporting plate, and the surface light being reflected by the original to the receiving surface of the image sensor thus an image of the original is captured by the image sensor.

18. The image scanner of claim 17, wherein each diffusing particle is made of $Al_2O_3$.

19. The image scanner of claim 17, wherein the two encapsulation layers are arranged at two opposite sides of the image sensor, each encapsulation layer is prism-shaped having the output surface thereof angled relative to the supporting surface.

20. The image scanner of claim 17, wherein the enclosure comprises a baseboard and a holder extending upwardly from a peripheral portion of the baseboard, the image sensor is arranged on a central portion of the baseboard, and the supporting plate is attached to a distal end of the holder away from the baseboard and substantially parallel to the baseboard.

* * * * *